Dec. 1, 1959

J. RABINOW 2,915,315

SERVO ARM FOR PHONOGRAPH PICKUPS

Filed June 14, 1954

INVENTOR

Jacob Rabinow

BY Max L. Libman

ATTORNEY

United States Patent Office 2,915,315

Patented Dec. 1, 1959

2,915,315

SERVO ARM FOR PHONOGRAPH PICKUPS

Jacob Rabinow, Takoma Park, Md., assignor of fifteen percent to Max L. Libman, Vienna, Va.

Application June 14, 1954, Serial No. 436,434

6 Claims. (Cl. 274—13)

This invention relates to a support for a phonograph pickup, and more particularly to a support which is driven by external motor means so as to produce straight line motion of the pickup and to eliminate tracking errors commonly present in conventional tone-arms.

It is common practice in modern record players to mount the phonograph pickup on an arm that is pivoted at some point beyond the rim of the turntable. Such arms can be made to move with very little friction above their pivots but suffer from the unfortunate effect of being unable, in their simplest forms, to eliminate the lack of tangency between the pickup and the record groove. This gives rise to tracking distortion, and undesirable pressures on the sides of the stylus tip.

The offset arm, which is the type almost universally used at present, reduces the tracking errors but does not eliminate them, since it increases the side pressure on the stylus.

Various attempts have been made to eliminate the tracking error by the use of special mechanisms to insure tangency. The best known, probably, involves the use of a straight line track on which the pickup rides. The track is so positioned that the stylus path passes through the center of the record. This eliminates tracking error, but such supports, unfortunately, have much more friction than the pivoted tone-arm, and this, together with the effects of the wire lead stiffness, have prevented such arms from gaining widespread use.

The matter of the stiffness of the electrical leads that connect the pickup to the amplifier is becoming more important as the vertical force necessary for proper pickup operation is reduced. There are several pickups on the market today which can operate successfully with a vertical force on the stylus of only one gram. Some of these pickups use radio-frequency modulating mechanisms requiring special, and rather stiff, shielded leads between the pickup and the rest of the associated electronic circuitry. It is obvious that with a vertical force of only one gram, the lateral force that the pickup can deliver to the arm is of the same order of magnitude, and the freedom with which the support can move becomes of paramount importance.

It is a primary object of my invention to provide a support for the pickup which will produce essentially straight line motion at the stylus tip. It is a further object to remove the burden of bending the wire leads from the delicate stylus mechanism. Another object of my invention is to provide a novel trip to lift the pickup from the record at the end of the recording, and, if desired, to stop the turntable motor. I accomplish these and other objects of my invention by providing a servo mechanism for the pickup support in such a manner that a low friction arm is used only to provide a very small amount of lateral freedom to the pickup and the main component of the lateral motion is accomplished by separate motor means powerful enough to overcome the friction and wire stiffness effects above mentioned.

By limiting the speed of my servo to a value slightly higher than that necessary for the maximum lateral travel during the signal reproducing cycle, I can detect the presence of the run-off groove commonly provided at the end of the recording. Specifically, I provide a trip which is energized when the servo is no longer able to follow the stylus.

The specific nature of the invention as well as other objects and advantages thereof will clearly appear from a description of a preferred embodiment as shown in the accompanying drawing, in which.

Figures 1, 3:
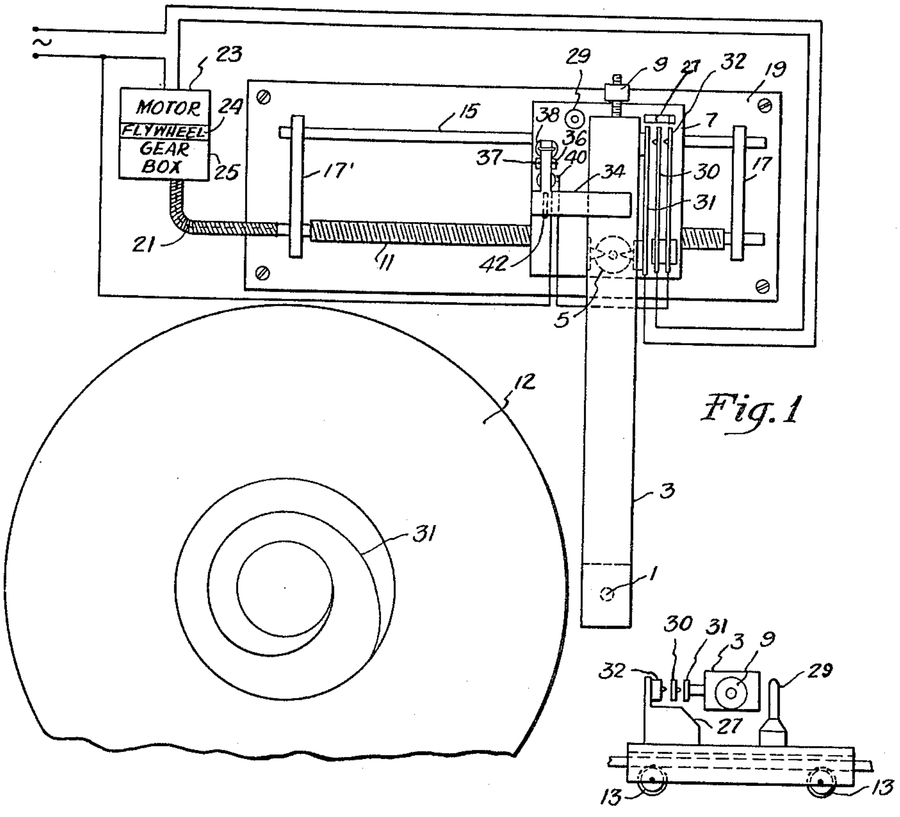
Fig. 1 is a plan view of one embodiment of my invention.
Fig. 3 is a rear elevation of the tone-arm and its mounting platform.

Referring to Fig. 1, the pickup is mounted on a more or less conventional tone arm 3 which is provided with the usual horizontal and vertical pivots shown schematically as assembly 5. The arm 3 is free to swing on 5 laterally through an angle in the order of 15° toward the center of the record 12, and through a smaller angle in the opposite direction, as will be shown later.

The vertical freedom of the arm is as follows: The head 1 can descend below the surface of the record to be played, and its freedom in the upper direction is limited by the clearance between the back end of the arm 3 and its supporting plate 7. A counterweight 9 is attached to the back portion of the arm 3 to reduce the vertical force on the stylus. Other known means to produce this effect can be employed, such as adjustable spring means.

The plate 7 is supported in the playing position by the half-nut 10 resting on the screw 11. It is also supported by two wheels 13 riding along the stationary guide shaft 15. The plate 7 and wheels 13 are preferably so dimensioned that the whole assembly of the plate and the arm cannot be removed from the shaft 15 without disassembling the whole device. The screw 11 is journalled in the vertical members 17, 17', which are fixed to base plate 19, which has suitable means for attachment to the main frame of the phonograph, such as screws. The shaft 15 is also attached to the vertical supporting members 17, 17'.

As shown in Fig. 1, the inner end of the screw 11 is connected through a flexible shaft 21 to an electric motor 23 provided with a suitable gear reduction box 25. Such motor-and-gear reducers are readily available today, particularly in the electric timer field. A very small, self starting motor is all that is needed since the speed of screw 11 is very low, even when the stylus is traversing a 78 r.p.m. record. The purpose of using a flexible shaft bent at a right angle as shown is to insure that no motor vibrations are transmitted to screw 11. However, it will be apparent that direct mechanical connection could also be employed.

Fig. 3 shows the back end of the pickup arm 3 and shows also two positioning members 27 and 29 which come into play when the arm 3 is tilted upward, that is, when the needle is removed from the playing groove. Stop 27 is a cam device which forces the arm 3 into perpendicularity with respect to screw 11 when the arm is tilted upward, either manually, or by automatic means later disclosed. Stop 27 acts to stop the arm 3 from moving too far in the clockwise direction when viewed from above, as in Fig. 1. Stop pin 29 comes into play to limit the counter-clockwise rotation of the arm 3 only when it is manually lifted far enough to cause the back end of the arm to contact the plate 7. When the arm is so tilted, for example, when it is desired to start the playing cycle, the half-nut 10 is kept out of contact with the screw 11. As the arm is lowered, the half-nut comes to rest on the screw 11, the back end of the arm lifts off the plate 7, and the stylus can be lowered onto the record disc. In this position, the back stops 27 and 29 no longer touch the arm and the stylus is free to follow the record groove for a limited angle.

As the record is played, the arm swings in a general clockwise direction (assuming an outside-in recording). A light spring switch 30 is mounted on the platform 7 and is insulated therefrom. The switch is so positioned that it just is contacted by the insulated contact blade 31 on arm 3 when the latter is perpendicular to the center line of the screw 11. As the arm 3 begins to swing clockwise due to the action of the stylus in the record groove, the arm closes the switch 30, 31, and thus closes the circuit of electric motor 23. The motor begins to rotate the screw so as to move the platform 7 so as to follow the stylus. If the speed of the platform is made slightly higher than the average lateral velocity of the stylus, the arm 3 will begin to rotate in a counter-clockwise direction relative to the platform 7 and this will eventually break the circuit of the switch 30. Under ideal conditions, the motor will then wait until the contact closes again, and the action will be repeated. I prefer to use a relatively heavy flywheel 24 with motor 23. This insures relatively slow, smooth starting; furthermore, if the flywheel is made sufficiently heavy so that it will continue to rotate by its inertia during the entire period between "on" cycles, the lateral speed of the pickup can be made to vary only slightly between a speed a little higher than its average and a speed a little lower than its average speed, producing an extremely smooth action. In actual practice, the arm 3 is always swinging from side to side slightly and so the contact will be periodically made and broken, but the duration of the "on" time is necessarily such that the platform 7 will follow the lateral motion of the stylus.

It should be noted that the above mechanism does not provide a true straight line motion for the stylus, but rather, that the actual path is a series of small arcs. However, since very small deviations from tangency produce no ill effects with regard to arcing distortion and side forces, these minute deviations from a theoretically straight line motion are of no practical significance.

It will be seen from the above description of the main features of my invention that if the electrical wiring to the pickup and the contact is rigidly attached to the platform 7, the main bending forces will be borne by the motor driven platform and not by the pickup arm. The arm is required to provide sufficient lateral movement to bend its cable very slightly during each of the servo cycles, but the angle through which this has to be done is so small, that the force can be made negligible in the cable by properly dressing it during assembly.

Figure 2:
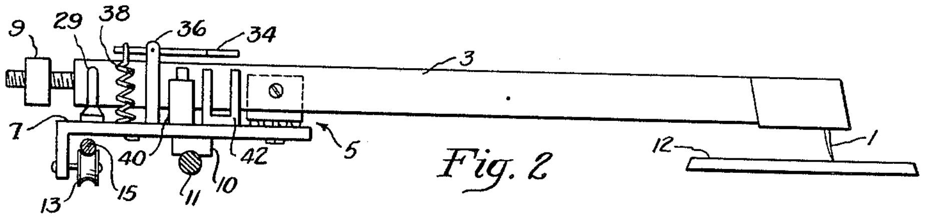
Fig. 2 is a side elevation of the device shown in Fig. 1.

Most of the records manufactured for home consumption today have a "fast" runoff groove 31 at the end of the recording. These high-pitch grooves cause the pickup to move rapidly in the lateral direction when it enters the spiral. Screw 11 and motor 25 are not designed to follow such rapid motion and the arm 3 will thus assume an angle relative to the center line of the screw considerably less than the 90° that it maintains during the motion previously described. The blade of switch 30 will be bent further back and must be sufficiently flexible to withstand this action without harm. A second switch-blade 32 is provided similar to switch 30, but spaced at a greater distance from the arm 3 so as to be actuated by the above described large swing at the end of the record. In order to lift the pickup from the record after the switch 32 has closed, I provide a rocking ferromagnetic plate 34 journalled in two vertical members 36 and 37 attached to the platform 7. This plate is normally kept, as shown in Fig. 2, away from the arm 3 by a spring 38. Located under one edge of this plate is an electro-magnet 40 actuated by the contact 32. Also located under the same edge of the rocker plate 34 is a permanent magnet 42. The spring 38 is just strong enough to keep the plate from being rocked by the attraction of the magnet 42. When the contact 32 is closed, however, the additional pull of the electromagnet is more than sufficient to overcome the pull of the spring 38, and the plate 34 is rocked into engagement with the arm 3. This lifts the pickup head from the record. By spacing permanent magnet 42 further from the pivot of the rocker arm 34 than electromagnet 40, even a relatively weak magnet is effective to hold the rocker depressed once it engages the rocker.

I do not consider it desirable to have the motor 23 continue to run or to have the electromagnet 40 energized after the arm has been lifted as described above. Therefore, switches 30 and 32 are arranged to close only when the pickup end of the arm is down in the normal playing position. When the arm is lifted, the contacts cannot close their respective circuits. The adjustment and spacing must be such that switch 32 stays closed until just before the arm has reached its fully lifted position. The moment of inertia of the arm in the vertical plane, together with the action of the permanent magnet insure the full lifting of the arm even after the circuit of the contact 32 is broken. All that is necessary to restore the rocking plate 34 to its normal position is to manually lower the pickup, as is done when beginning to play a new record, thus moving the rocking plate 34 forcibly away from the magnet 42 into the position shown in Fig. 2. Plate 34 may preferably be held a slight distance above arm 3 by the normally unrestrained position of spring 38, or a suitable stop may be provided to limit the upward motion of plate 34. Various mechanical trips can be substituted for the electrical trip described above, but in view of the present trend to lighter pickups, I prefer to provide the extremely sensitive device described, which can be actuated by a mechanical force only sufficient to flex the very light and thin spring blades.

The use of a screw and a half-nut requires some practical precautions. In order to facilitate the proper meshing of the screw and nut, they should be cut with a sharp V thread. The half-nut 10 can be provided with some looseness in its attachment to the plate 7 so as to center itself properly on the screw. However, the screw is normally exposed and subject to dust and dirt and this dust may tend to grind into the threads of the nut and screw and cause rough action of the mechanism unless it is periodically cleaned. If desired, the half-nut may be a felt pad which forms its own thread on screw 11.

Figure 4:
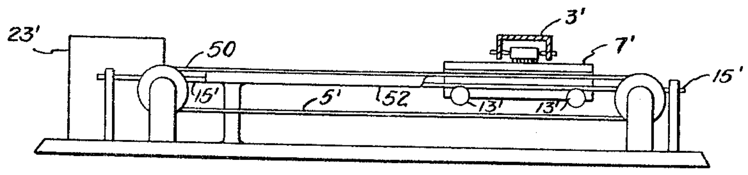
Fig. 4 is a front elevation, partly in section, of a modified form of the invention.

Fig. 4 shows another embodiment of the invention, wherein the lead screw is not employed. Instead, I provide a flat conveyor belt 50 driven by the motor 23'. Instead of the half-nut of Fig. 1, the plate is simply permitted to rest directly on the upper surface of this belt. The belt rests on a polished supporting platform 52, and can be kept taut by any suitable means. The rest of the structure will be just as shown in Fig. 1.

It should be understood that the two embodiments described above do not limit the scope of my invention. There are many ways of moving the arm by servo mechanisms. The pickup for the servo need not be the simple contact shown. Various known proportional pickups can be used to detect the position of the arm and to correct its angle. In fact, it is also possible to use the electrical output of the phonograph pickup itself to actuate the servo motor to move the arm. This is particularly true in the case of amplitude pickups like the Weathers pickup or the Zenith Cobra pickup. A pickup of this type may be mounted directly on a servo-driven platform, and since the output is a function not only of the signal modulation of the groove, but also of the position of the arm relative to the center line of the groove, this portion of the output may be used in a more sophisticated servo device to move the platform so as to follow the center line of the groove not only in the general direction toward the center, but also outward so as to follow the eccentricities of the record. However, such a mechanism would be much more expensive than the simple device shown here.

While this invention is illustrative as applied to disc record machines, it is equally suited to those using cylindrical records.

It will be apparent that the embodiments shown are only exemplary and that various modifications can be made in construction and arrangement within the scope of my invention as defined in the appended claims.

I claim:

1. A phonograph tone arm for the support of a pickup adapted to reproduce the frequency intelligence of a record in contact with said pickup, said tone arm comprising a member attached to said pickup, a second member arranged to travel along a guide structure in a path parallel to the desired motion of the pickup when the latter is in the process of reproducing the intelligence on the record, said first member being journalled on said second member for limited motion in both the horizontal and vertical directions so that the pickup can move across the record and at right angles to its surface, detector means to determine the point at which the angular relationship between said first and said second members deviates from a predetermined value due to the pickup following the record, and servo means controlled by said detector means and acting on said second member to move the member along said guide structure in a direction such as to restore the predetermined angular relationship between said first and second members.

2. A tone arm carrying a pickup on one end and pivoted at the other end to a movable platform, supporting means for said plaftorm arranged to guide said platform for motion in a direction parallel to that required of said pickup for proper reproduction of a disc record, sensing means to detect the angular position of the tone arm relative to the movable platform in a plane parallel to the plane of a disc record being played, and servo means responsive to said sensing means to move the platform along said supporting means so as to keep the angular relationship between the tone arm and the platform substantially contant.

3. For use with a phonograph having means for rotating a disc record with a grooved sound track, a phonograph tone arm system comprising a tone arm having a phonograph pickup mounted on one end thereof, and a pivot point spaced on said arm from said end; support means supporting said tone arm on said pivot point for limited angular motion along a phonograph record being played, in a direction perpendicular to the sound track; drive means including a motor for moving said support means in a straight line parallel to a desired path of travel of said pickup during record play at a speed slightly greater than a desired average rate of speed of the pickup perpendicular to said sound track, whereby during record play the support is driven by said drive means ahead of said pickup until said one arm assumes a predetermined angle with the path of motion of said support means; detector means responsive to the angular pivotal relationship between the tone arm and the support at said predetermined value to produce an electric signal, servo means responsive to said electric signal for reducing the speed of said drive means to a rate less than necessary to maintain said desired average rate of speed when said predetermined angle is attained, whereby the tone arm reverts to its original angle during further play; and means for increasing the speed of the tone arm to its original value when said original angle is attained.

4. The invention according to claim 3, and further detector means responsive to a still greater deviation of said tone arm than the angle between said predetermined angle to produce a second electric signal, and electrically controlled arm lifting means responsive to said signal and said original angle for removing said pickup head from the playing surface of a record being played.

5. A phonograph tone arm system comprising a tone arm having a pickup at one end and a counterweight near the other end; a movable platform, a universal pivot intermediate said ends inseparably supporting said arm on said platform for limited pivoted motion in the plane of said platform and perpendicular thereto, a guide rail extending parallel to a desired path of movement of said pickup, means inseparably supporting said platform for translatory motion on said guide rail and for limited angular motion with respect to said guide rail, motor drive means for producing said translatory motion of said platform along said guide rail, switch means mounted on said platform for actuation by said tone arm at a predetermined angular deviation of the tone arm in the plane of the platform from the perpendicular to said guide rail for energizing and deenergizing said motor drive means in accordance with the angular deviation of said tone arm in a plane parallel to the path of said guide rail from a reference position.

6. The invention according to claim 5, and second switch means on said platform for actuation by said tone arm at a greater angular deviation of said arm in said plane than said first angular deviation, and lift means controlled by said second switch means for moving said arm in a second plane perpendicular to said first plane to raise said pickup from a record.

References Cited in the file of this patent

UNITED STATES PATENTS

| | | |
|---|---|---|
| 2,254,412 | Badmaieff | Sept. 2, 1941 |
| 2,436,529 | Pressley | Feb. 24, 1948 |
| 2,455,466 | Brubaker | Dec. 7, 1948 |
| 2,536,892 | Sinnett | Jan. 2, 1951 |
| 2,679,622 | Deri | May 25, 1954 |

FOREIGN PATENTS

| | | |
|---|---|---|
| 355,399 | Great Britain | Aug. 27, 1931 |
| 572,830 | Germany | Mar. 23, 1933 |